United States Patent Office 3,466,291
Patented Sept. 9, 1969

3,466,291
4(2-DIALKYLAMINOETHOXY OR 2-PIPERIDINO-
ETHOXY) - 9,10 - DIHYDRO BENZO[4,5]CYCLO-
HEPTA[1,2-b]THIOPHENE DERIVATIVES
Ernst Jucker, Ettingen, Anton Ebnother, Reinach, Basel-
Land, and Jean-Michel Bastian, Birsfelden, Switzerland,
assignors to Sandoz Ltd. (also known as Sandoz A.G.),
Basel, Switzerland
No Drawing. Filed Feb. 13, 1967, Ser. No. 615,380
Claims priority, application Switzerland, Feb. 16, 1966,
2,258/66
Int. Cl. C07d 63/18; A61k 27/00
U.S. Cl. 260—293.4
4 Claims

ABSTRACT OF THE DISCLOSURE

The present invention provides basic ethers of benzo-
cycloheptathiophenes of formula:

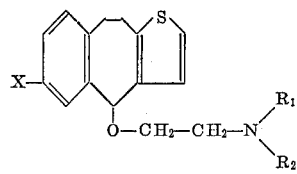

in which X is hydrogen or chlorine, and each of $R_1$ and
$R_2$ is alkyl of 1 to 4 carbon atoms, or $R_1$ and $R_2$ together
with the nitrogen are piperidine, and the pharmaceuti-
cally acceptable acid addition salts thereof. The com-
pounds I exhibit the typical properties of antidepressants.
The compounds also have peripheral and central anti-
cholinergic effects. They have a pressoric effect on the
blood pressure of dogs. They exhibit a histamine, acetyl-
choline and serotonin inhibiting effect in vitro. Further-
more, they are characterized by a broncholytic effect. The
production of these compounds is furthermore described.

The present invention relates to new tricyclic ethers and
a process for their production.
The present invention provides basic ethers of benzo-
cycloheptathiophenes of general Formula I,

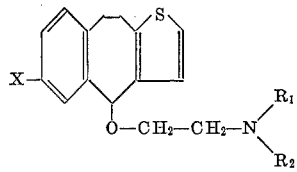

in which X signifies a hydrogen or chlorine atom, and
each of
$R_1$ and $R_2$ signifies an alkyl radical having 1 to 4 carbon
atoms, or
$R_1$ and $R_2$ together with the nitrogen atom form a
piperidine ring,
and their acid addition salts.
The present invention further provides a process for
the production of compounds of general Formula I and
their acid addition salts, characterized in that a benzo-
cycloheptathiophene derivative of general Formula II,

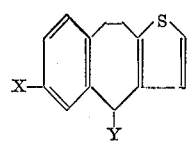

in which X has the above significance, and
Y signifies a hydroxyl radical, a halogen atom or an aryl-
or alkyl-sulphonyloxy radical, is reacted with an aminoethane derivative of general
Formula III,

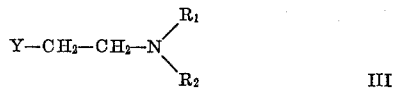

in which $R_1$, $R_2$ and X have the above significance, and
Y signifies a hydroxyl radical, when Y in Formula II sig-
nifies a halogen atom of an aryl- or alkyl-sulphonyloxy
radical, or
Y signifies a halogen atom or an aryl- or alkyl-sulphonyl-
oxy radical when Y in Formula II signifies a hydroxyl
radical,
in an anhydrous solvent and in the presence of an acid
binding agent, at the boiling temperature of the solvent, and
the resulting compound of Formula I is optionally con-
verted into its acid addition salts.
The new compounds of Formula II, in which Y sig-
nifies the hydroxyl radical, may be produced from the
corresponding 9,10-dihydro - 4H - benzo[4,5]cyclohepta
[1,2-b]thiophen-4-ones by reduction with zinc and
sodium hydroxide, with complex metal hydrides, e.g.
sodium borohydride or lithium aluminium hydride, or by
catalytic hydrogenation, e.g. over palladium catalysts at
an elevated pressure.
The new compounds of Formula II, in which Y signifies
a halogen atom or an aryl- or alkyl-sulphonyloxy radical,
are obtained from the corresponding hydroxy compounds
by treating with a hydrogen halide, a thionyl halide or an
aryl- or alkyl-sulphonyl halide, e.g. p-toluenesulphonyl
chloride or methanesulphonyl chloride.
Examples of starting materials of Formula II which
may be used are: 9,10-dihydro-4H-benzo[4,5]cyclohepta
[1,2-b]thiophen-4-ol and the corresponding 6-chloro
derivative, 4-halogen- and 4-sulphonyloxy-9,10-dihydro-
4H-benzo[4,5]cyclohepta[1,2-b]thiophenes, e.g. 4-chloro-
and 4,6-dichloro-9,10 - dihydro-4H-benzo[4,5]cyclohepta
[1,2-b]thiophene or 4-(p-toluenesulphonyloxy)-9,10-di-
hydro-4H-benzo[4,5]cyclohepta[1,2-b]thiophene.
Examples of starting materials of Formula III which
may be used are: 2-dimethylamino-ethanol and N-(2-
hydroxyethyl)-piperidine and their aryl- and alkyl-sul-
phonyl esters, e.g. the p-toluenesulphonyl ester, and 2-
dimethyl-aminoethyl chloride or bromide or N-(2-chloro-
ethyl- or 2-bromoethyl)-piperidine.
One method of effecting the process of the invention is
as follows: A benzocyclohepta-thiophen-4-ol of Formula
II is slowly added to a suspension of sodium potassium or
lithium amide or hydride in absolute benzene and the
resulting solution is subsequently heated at reflux for
several hours. A solution of an ester of Formula III, in
which Y signifies a halogen atom or aryl- or alkyl-
sulphonyloxy, in absolute benzene is then added dropwise
at the boil and heating to the boil is continued for several
hours. After cooling, the organic solution is shaken out
with water, and the resulting compounds of Formula I
are isolated from the reaction mixture and purified in
manner known per se, e.g. by filtration through diato-
maceous earth, by high vacuum distillation and/or con-
version into a suitable salt.
In accordance with another embodiment of the inven-
tion the process is effected as follows: A solution of a
benzocycloheptathiophen-4-ol in absolute benzene is satu-
rated with dry hydrogen chloride at a temperature of 10–
20° C., the solution is dried over calcium chloride and fil-
tered. Alternatively the calculated amount of thionyl chlo-
ride may be added dropwise and stirring effected at room
temperature for about 30 minutes. 4-chloro-9,10-dihydro-
4H-benzo[4,5]cyclohepta[1,2-b]thiophene is unstable and
is used for further reaction in solution without purifica-
tion. The 4,6-dichloro derivative is, however, stable and may be isolated and purified by crystallization. A solution of a compound III, in which Y signifies the hydroxyl radical, and an acid binding agent, e.g. sodium carbonate, potassium carbonate or triethylamine in absolute xylene, is then added at the boil to the solution of the 4-chloro derivative and heating to the boil is effected for several hours. After cooling, the organic solution is shaken out with water, and the resulting compounds of Formula I are isolated from the reaction mixture and purified in manner known per se, e.g. by filtration through diatomaceous earth, by high vacuum distillation and/or conversion into a suitable salt.

The benzocyclohepta-thiophen-4-ol is produced, for example, by dissolving the corresponding ketone in boiling ethanol. Sodium hydroxide and zinc powder are then added portionwise to the solution, and the reaction mixture is heated to the boil for a further 1 to 2 hours, after which the inorganic residue is separated. After acidifying the filtrate, the benzocyclohepta-thiophen-4-ol may be isolated and purified in manner known per se. The desired carbinol may also be obtained by reduction with complex metal hydrides. Thus, for example, aqueous sodium borohydride and sodium hydroxide are added to a solution of the ketone in methanol and the mixture is stirred at room temperature for 2 to 5 hours and subsequently at 60° for 1 to 2 hours, after which the carbinol is isolated from the reaction mixture and purified in manner known per se.

Compounds of Formula I are basic compounds; with inorganic or organic acids they form stable salts which are crystalline at room temperature. Examples of acids for acid addition salt formation are: hydrochloric, hydrobromic, phosphoric, sulphuric, malonic, fumaric, maleic, tartaric, malic, hexahydrobenzoic and p-toluenesulphonic acid.

In animal tests compounds I exhibit the typical properties of antidepressants, which manifest themselves, inter alia, by a pronounced inhibition of the tetrabenazine syndrome (ptosis and catalepsy) and by a potentiation of catecholamines (adrenalin, noradrenalin). These effects are particularly pronounced in the case of 4(2-dimethylaminoethoxy)9,10 - dihydro - 4H - benzo[4,5]cyclohepta [1,2-b] thiophene. The compounds also have peripheral and central anticholinergic effects. They have a pressoric effect on the blood pressure of dogs. They exhibit a histamine, acetylcholine and serotonin inhibiting effect in vitro. Furthermore, they are characterized by a broncholytic effect. The sedative-neuroleptic properties of the compounds are weak.

The compounds are indicated for use in therapy, particularly in psychiatry in the treatment of conditions of depression, i.e. they are capable of normalizing the pathologically depressed and often anxious mood, and in internal medicine in the treatment of various allergic conditions and asthma. They are preferably administered in the form of their physiologically tolerated, water-soluble salts in a daily dose of 20–500 mg.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are:

for tablets and dragees: lactose, starch, talc and stearic acid;
for injectable solutions: water, alcohols, glycerin and vegetable oils.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade; the melting points are uncorrected.

EXAMPLE 1

4-(2-dimethylaminoethoxy)-9,10-dihydro-4H-benzo [4,5]cyclohepta[1,2-b]thiophene 9.5 g. of 9,10-dihydro-4H-benzo[4,5]cyclohepta[1,2-b] thiophen-4-ol are slowly added to a suspension of 4.0 g. of sodium amide in 100 ml. of absolute benzene and the resulting solution is subsequently heated at reflux for 2 hours. A solution of 9.0 g. of 2-dimethylaminoethyl chloride in 50 ml. of absolute benzene is then added dropwise at the boil during the course of 15 minutes and heating to the boil is effected for a further 5 hours. After cooling, the reaction mixture is filtered through highly purified diatomaceous earth and the solvent is evaporated at reduced pressure. The oily residue is distilled in a high vacuum, whereby 4-(2-dimethylaminoethoxy)-9,10-dihydro-4H-benzo[4,5]cyclohepta[1,2-b]thiophene distils over at 190–193°/0.001 mm. of Hg as a yellowish oil.

Hydrogen maleate.—A solution of 2.4 g. of maleic acid in 400 ml. of ether is added to a solution of 6.0 g. of the distilled base in ether. After standing at 0° for several hours, the precipitated hydrogen maleate is filtered off and recrystallized from isopropanol. The analytically pure compound has a melting point of 98.5–99.5°.

The 9,10 - dihydro - 4H - benzo[4,5]cyclohepta[1,2-b]thiophen-4-ol used as starting material may be produced as follows:

(I) 60.0 g. of sodium hydroxide are added portionwise to a solution of 50.0 g. of 9,10-dihydro-4H-benzo[4,5] cyclohepta[1,2-b]thiophen-4-one in 500 ml. of boiling 95% ethanol and heating to the boil is effected until a clear solution results. 90.0 g. of zinc powder are then slowly added portionwise and heating to the boil is effected for a further 1½ hours. The inorganic residue is filtered off, washed with ethanol and the filtrate is concentrated by evaporation at reduced pressure. The solid residue is triturated with 200 ml. of water and the pH value of the suspension is adjusted to 7 by the addition of dilute hydrochloric acid whilst cooling. The mixture is extracted several times with methylene chloride, the organic extracts are washed with water, dried over magnesium sulphate and the solvent evaporated at reduced pressure. After recrystallization from hexane pure 9,10-dihydro-4H-benzo[4,5]cyclohepta[1,2-b]thiophen-4-ol, having a melting point of 111–112°, is obtained.

(II) A solution of 35.2 g. of sodium borohydride in 130 ml. of water and 2.2 ml. of 38% sodium hydroxide is added dropwise to a solution of 50.0 g. of 9,10-dihydro-4H-benzo[4,5]cyclohepta[1,2-b]thiophen-4-one in 900 ml. of methanol. The resulting solution is stirred at room temperature for 2½ hours and subsequently at 60° for 1½ hours, is subsequently cooled and slowly diluted with 900 ml. of water whilst stirring. The precipitated material is filtered off, washed with dilute acetic acid and water and dried in a water jet vacuum at 60°. After recrystallizing several times from hexane the resulting carbinol has a melting point of 111–112°.

EXAMPLE 2

4 - (2-dimethylaminoethoxy)-9,10-dihydro-4H-benzo[4,5] cyclohepta[1,2-b]thiophene 15.0 g. of 9,10-dihydro-4H-benzo[4,5]cyclohepta[1,2-b] thiophen-4-ol are dissolved at 40° in 350 ml. of absolute xylene and the resulting solution is saturated with dry hydrogen chloride at 10°. The solution is then dried twice over 10 g. of pulversized calcium chloride and filtered. After the addition of a third portion of 10 g. of calcium chloride the excess hydrogen chloride is removed at 15 mm. of Hg in an atmosphere of nitrogen (time: about 4 hours). The resulting solution is filtered through active charcoal and is added dropwise during the course of 2 hours to a boiling solution of 6.64 g. of 2-dimethylaminoethanol and 10 g. of sodium carbonate in 50 ml. of absolute xylene. Heating to the boil is subsequently effected for a further half hour, cooling is effected at 10°, the insoluble portion is filtered off and washed with xylene. The combined xylene solutions are washed with water, dried over magnesium sulphate and the solvent is evaporated at reduced pressure. The oily residue is distilled in a high vacuum whereby 4-(2-dimethyl-aminoethoxy)-9,10-dihydro-4H-benzo[4,5]cyclohepta[1,2-b]thiophene distils over at 190–193°/0.001 mm. of Hg as a yellowish oil.

EXAMPLE 3

4 - (2 - piperidinoethoxy)-9,10-dihydro-4H-benzo[4,5]cyclohepta[1,2-b]thiophene

The compound indicated in the heading is obtained from 2.0 g. of sodium amide, 4.8 g. of 9,10-dihydro-4H-benzo[4,5]cyclohepta[1,2-b]thiophen-4-ol and 6.2 g. of 1-(2-chloroethyl)-piperidine in 35 ml. of absolute benzene, in a manner analogous to that described in Example 1. The base has a boiling point of 195–202°/0.05 mm. of Hg.

Hydrochloride.—A solution of hydrogen chloride in ether is added to a solution of the base in ether. The precipitated hydrochloride is filtered off and recrystallized from isopropanol/ether. Melting point 165–167° (decomposition).

EXAMPLE 4

6 - chloro-4-(2 - dimethylaminoethoxy)-9,10-dihydro-4H-benzo[4,5]cyclohepta[1,2-b]thiophene The compound mentioned in the heading is obtained from 4.0 g. of sodium amide, 10.0 g. of 6-chloro-9,10-dihydro-4H-benzo[4,5]cyclohepta[1,2 - b]thiophen-4-ol and 8.6 g. of 2-dimethylaminoethyl chloride in 100 ml. of absolute benzene, in a manner analogous to that described in Example 1. The base has a boiling point of 185–190°/0.0008 mm. of Hg (melting point 88–89°, after recrystallization from ether).

Hydrogen maleate.—A solution of 3.2 g. of maleic acid in 500 ml. of ether is added to a solution of 9.0 g. of the base in ether. After standing at 0° for several hours decantation is effected and the hydrogen maleate is recrystallized from isopropanol. The analytically pure compound has a melting point of 120.5–122° with decomposition.

The 6-chloro - 9,10 - dihydro-4H-benzo[4,5]cyclohepta[1,2-b]thiophen-4-ol used as starting material may be produced as follows:

(I) From 55.0 g. of 6-chloro-9,10-dihydro-4H-benzo[4,5]cyclohepta[1,2-b]thiophen-4-one, 500 ml. of 95% ethanol, 60.0 g. of sodium hydroxide and 90.0 g. of zinc powder, in a manner analogous to that described in Example 1 (I). After recrystallization from ether/hexane pure 6 - chloro - 9,10 - dihydro-4H-benzo[4,5]cyclohepta[1,2-b]thiophen-4-ol has a melting point of 131–133°.

(II) From 50.0 g. of 6-chloro-9,10-dihydro-4H-benzo[4,5]cyclohepta[1,2-b]thiophen-4-one in 800 ml. of methanol and 30.6 g. of sodium borohydride in 115 ml. of water and 2.0 ml. of 38% sodium hydroxide, in a manner analogous to that described in Example 1 (II). Melting point 131–133° (from ether/hexane).

EXAMPLE 5

4 - (2-dimethylaminoethoxy)-9,10-dihydro-4H-benzo[4,5]cyclohepta[1,2-b]thiophene A solution of 10.30 g. of 9,10-dihydro-4H-benzo[4,5]cyclohepta[1,2-b]thiophen-4-ol and 10.5 g. of p-toluenesulphonyl chloride in 50 ml. of absolute pyridine is stirred at room temperature for 5 hours. The pyridine is subsequently distilled off at 15 mm. of Hg and is completely removed azeotropically by adding water thrice, each time 100 ml. The residue is subsequently dissolved in 50 ml. of chloroform and the solution shaken out thrice, each time with 50 ml. of water, dried over sodium sulphate and concentrated by evaporation. 8.75 g. of dimethylaminoethanol in 50 ml. of absolute xylene are added and the solution is heated to the boil at reflux for half an hour, is subsequently cooled to room temperature and 40 ml. of 1 N sodium hydroxide are added thereto. The xylene phase is subsequently removed and the aqueous phase is shaken out twice more, each time with 30 ml. of ether. The combined xylene and ether extracts are washed with water until neutral, dried over magnesium sulphate and purified over animal charcoal. After distilling off the solvent, the oily residue is distilled in a high vacuum, whereby 4-(2-dimethylaminoethoxy)-9,10-dihydro - 4H - benzo[4,5]cyclohepta[1,2-b]thiophene distils over at 190–193°/0.001 mm. of Hg as a yellowish oil and may be converted into the hydrogen maleate in a manner analogous to that described in Example 1. Melting point 98.5–99.5°.

Example of a galenical preparation:

| | Tablets, g. |
|---|---|
| 4-(2-dimethylaminoethoxy)-9,10-dihydro-4H-benzo[4,5]cyclohepta[1,2-b]thiophene Hydrogen maleate | 0.0286 |
| Magnesium stearate | 0.0020 |
| Polyvinyl pyrrolidone | 0.0040 |
| Talcum | 0.0060 |
| Maize starch | 0.0194 |
| For a tablet of | 0.0600 |

What is claimed is:

1. A compound selected from the group consisting of a compound of formula:

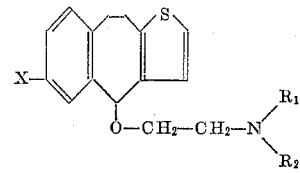

in which X is hydrogen or chlorine, and each of $R_1$ and $R_2$ is alkyl of 1 to 4 carbon atoms or $R_1$ and $R_2$ together with the nitrogen are piperidine, and the pharmaceutically acceptable acid addition salts thereof.

2. A compound according to claim 1, in which the compound is 4-(2-dimethylaminoethoxy)-9,10-dihydro-4H-benzo[4,5]cyclohepta[1,2-b]thiophene.

3. A compound according to claim 1, in which the compound is 4-(2-piperidinoethoxy)-9,10-dihydro-4H-benzo[4,5]cyclohepta[1,2-b]thiophene.

4. A compound according to claim 1, in which the compound is 6-chloro-4-(2-dimethylaminoethoxy)-9,10-dihydro-4H-benzo[4,5]cyclohepta[1,2-b]thiophene.

References Cited

UNITED STATES PATENTS 3,227,716   1/1966   Harms.

HENRY R. JILES, Primary Examiner

S. D. WINTERS, Assistant Examiner

U.S. Cl. X.R.

260—329, 332.2, 332.3, 332.5; 424—267, 275